Figure 1:
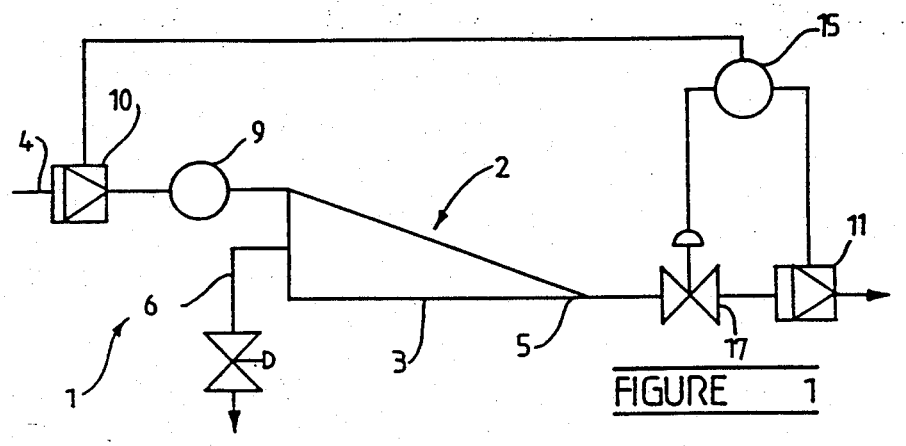

United States Patent [19]

Prendergast et al.

[11] Patent Number: 4,822,484

[45] Date of Patent: Apr. 18, 1989

[54] TREATMENT OF MULTIPHASE MIXTURES

[75] Inventors: Gavan J. J. Prendergast, Mount Waverley; David A. Webb, Northcote, both of Australia

[73] Assignee: Noel Carroll, Victoria, Australia

[21] Appl. No.: 86,144

[22] PCT Filed: Oct. 2, 1986

[86] PCT No.: PCT/AU86/00288

§ 371 Date: Jul. 31, 1987

§ 102(e) Date: Jul. 31, 1987

[87] PCT Pub. No.: WO87/01968

PCT Pub. Date: Apr. 9, 1987

[30] Foreign Application Priority Data

Oct. 2, 1985 [AU] Australia .................. PH2705/85

[51] Int. Cl.$^4$ .................. B01D 17/038; B01D 21/26
[52] U.S. Cl. .................. 210/96.1; 209/144; 209/211; 210/137; 210/512.1
[58] Field of Search .................. 210/512.1, 512.2, 97, 210/100–105, 109, 110, 112, 115, 130, 134, 137, 96.1; 209/144, 211, 39

[56] References Cited

U.S. PATENT DOCUMENTS 4,028,228  6/1977  Ferris et al. .................. 209/39

Primary Examiner—Frank Sever
Attorney, Agent, or Firm—Ladas & Parry

[57] ABSTRACT

The present invention relates to the treatment of multiphase mixtures and more particularly, though not exclusively, to multiphase mixtures in which at least two of the phases are liquids and the least dense liquid phases is present in quantities of at least 5%. One preferred application of the present invention relates to the treatment of oil/water mixtures (which may include gaseous and solid phases) such as that discharged from oil wells.

Research into the use of cyclone separators for the separation of oil/water mixtures has increased in recent years. One of the reasons for a growing interest in this area is because of the particular problems associated with off-shore platforms. One of the major problems is that of the weight of processing equipment and, as a result of this, attempts are continuously being made to try and reduce the weight of processing equipment. It is with this in mind that investigations have been conducted into the use of cyclone separators.

13 Claims, 2 Drawing Sheets

TREATMENT OF MULTIPHASE MIXTURES

Applicant has already devised cyclone separators of a unique type which can be used in the separation of oil/water mixtures where there is a relatively small amount of oil in the mixture (say less than 5%). Such separators are useful for cleaning the water discharging from a processing system so that it can be discharged directly into the sea without major contamination problems. Generally, separators which are used in such a manner require little if any control other than some control on the flow through the separator system.

There is another processing situation where cyclone separators could find application and that is for separating the product oil from the mixture discharged from the well. The separators of the type mentioned above have been found not to be suitable for use in applications where larger volumes of oil have to be separated. Applicant has devised several types of unique separators which are particularly suitable for this new application. This, however, is not the complete solution as control of these new separators has been found to be difficult particularly in practical situations.

It is therefore an object of the present invention to provide a multiphase mixture treatment system which enables satisfactory separation of the phases in that mixture.

According to the present invention there is provided, a multi-phase mixture treatment system the system comprising:

(a) mixture separation apparatus comprising at least one cyclone separator;
(b) an infeed flow line for delivering the multi-phase mixture to the mixture separation apparatus;
(c) at least two output flow lines from which separated or partially separated phases are discharged from the mixture separation apparatus;
(d) analysing means for analysing the mixture before and/or after entry to or discharge from the mixture separation apparatus; and
(e) central control means responsive to information received from said analysing means for controlling the flow rate in one or more of said flow lines.

This control means may allow for unattended operation whilst inlet concentrations vary extensively and continuously from, for example, 1% water to 40% water. In addition, the separation apparatus, means of analysis central control means and control equipment may be at remote or removed locations and may be separated by other process equipment such as pumps, vessels and other control means. The analysing means may take any suitable form and is preferably adapted to analyse or interpolate the various volumetric percentages of the particular phases making up the mixture or characteristics reflecting phase concentrations such as density, viscosity and the like. For example, in the particular application of oil/water mixtures, the analysing means may be in the form of capacitance probes.

In some instances, it may be desirable to provide additional information to the controller. For example, information relating to flow rate may be provided by means of flow indicators. Such flow indicators may be in the form of orifice plates or turbine meters by way of example.

The central control means may be for example, a pneumatic or electric controller which is programmable and preset so that it operates in response to information received from the analysing means.

The flow control means may take the form of valves or restrictions to flow such as choke valves and the like.

In certain instances, it may be desirable to reduce the amount of gas or substantially remove it from the mixture prior to the mixture being delivered to the mixture separation apparatus. To this end, means may be provided for separating gas from the mixture and such means may be in the form of a surge tank or the like.

Figure 4:
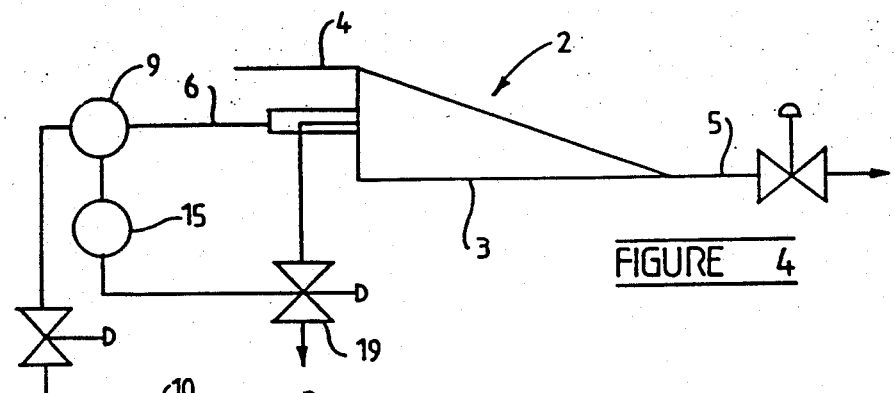
Figure 5:
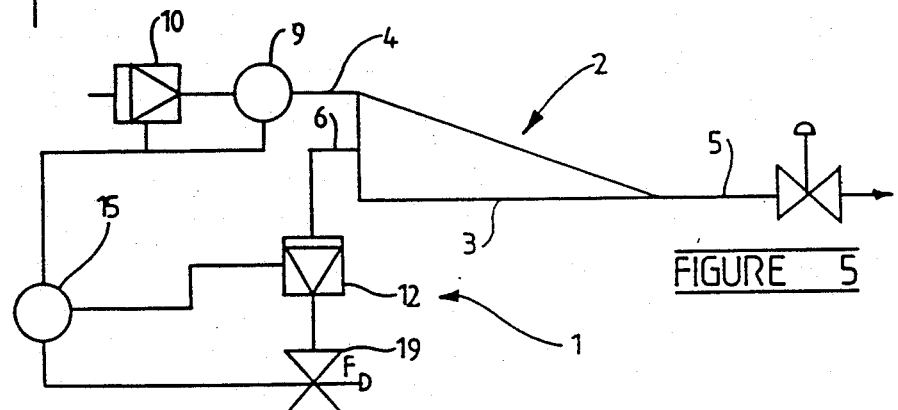
Figure 6:
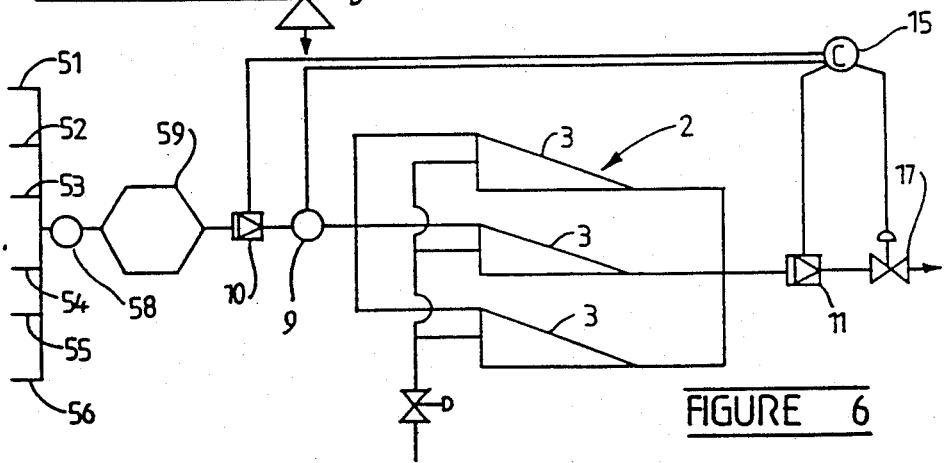

Preferred embodiments of the invention will hereinafter be described with reference to the accompanying drawings, and in those drawings:

FIGS. 1 to 5 are different system arrangements all in accordance with the system of the present invention; and FIG. 6 is one example of a practical application of the invention.

Referring to FIG. 1, there is shown a system generally indicated at 1 according to the present invention which includes a mixture separating apparatus generally indicated at 2 comprising a cyclone separator 3 of the type for separating relatively large amounts of oil from water. It will be appreciated that separation may not be complete during one pass and further cyclone separators may be required. An infeed flow line 4 delivers the oil/water mixture to the separator 3 and the water is discharged through output flow line 5 and the oil is discharged through output flow line 6.

In this particular embodiment an analyser disposed in the input feed line 4 is adapted to analyse or interpolate the various volumetric percentages of the oil/water mixture or characteristics reflecting phase concentrations such as density, viscosity or the like. In addition to this flow indicators 10 and 11 provide information concerning the flow rates of the input flow line 3 and the water output flow line 5. The information collected by the analyser 9, and flow indicators 10 and 11 is fed to a central controller 15. The controller 15 is adapted to open or close flow control valve 17 to provide for optimum separation of the oil/water mixture. Thus, in this particular system, the analyser 9 provides the central controller 15 with information relating to the mixture being fed to the separation apparatus.

Figure 2:
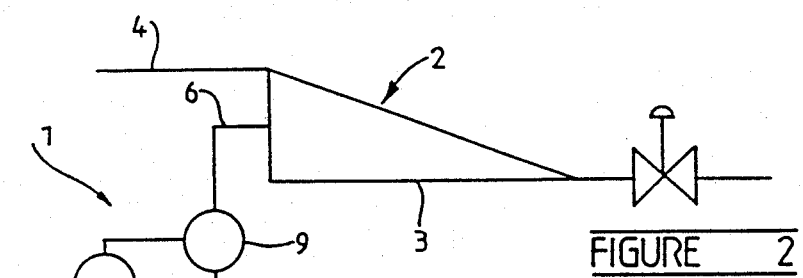

In FIG. 2, the system includes similar equipment to that shown in FIG. 1, except that there are no flow indicators provided and analyser 9 is arranged to analyse the mixture in oil output flow line 6 and the controller 15 is arranged to open or close flow control valve 19 which controls the flow in oil/output flow line 6.

Figure 3:
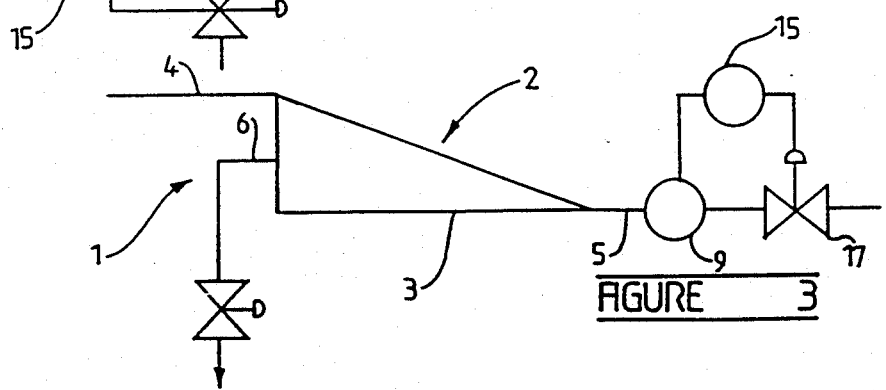

FIG. 3 is similar to that shown in FIG. 2 except that it is the water output flow line 5 which is analysed and the flow controlled by the controller 15 through flow control valve 17.

Referring to FIG. 4, there is shown a system in which the flow from the oil or lighter or phase output flow line 6 is analysed and controlled by central controller 15 through opening or closing of valve 19.

In the system of FIG. 5, the controller 15 controls flow from the lighter phase output flow line 6 although both the input to the separator as well as information from that output line are fed to the controller.

FIG. 6 shows a system for separation of oil/water mixtures where the oil/water mixture is fed to the system from a number of different oil wells 51 to 56. A pump 58 may assist in delivering the mixture to the system and a surge tank 59 may be provided to remove gas from the mixture. The mixture is fed to a bank of cyclone separators 3 arranged in parallel. An analysing device 9 and a flow meter 10 analyse the mixture prior to entry into the cyclone separators and feed this information to a controller 15. The controller also receives information as to the water output flow rate and from this information controls that flow rate through valve 17.

I claim:

1. A multi-phase mixture treatment system for the treatment of the mixture discharged from an oil well, the system including:
   (a) means for minimizing the weight of the system including at least one cyclone separator comprising elements designed, sized and arranged for separating a more dense liquid component from a less dense liquid component thereof, said separator comprising a separating chamber having a feed inlet at one end, an overflow outlet at said one end and an underflow outlet at the other end;
   (b) an infeed flow line for delivering the multi-phase mixture from the oil well to the feed inlet of the cyclone separator;
   (c) at least two outflow lines from which the separated or partially separated phases are discharged from the overflow and underflow outlets of the cyclone separator; and
   (d) means for controlling the separation of the mixture through the cyclone separator, said means including analyzing means for analyzing the mixture before and/or after entry to or discharge from the cyclone separator and a central control means responsive to information received from said analyzing means for controlling the flow rate from one or more of said flow lines.

2. The system according to claim 1 wherein said analysing means comprises one or more capacitance probes.

3. The system according to claim 2 wherein said analysing means further includes one or more flow indicators.

4. The system according to claim 3 wherein said control means comprises a pneumatic or electric controller which is programmable and preset so that it is operable in response to information received from the analysing means.

5. The system according to claim 2 wherein said control means comprises a pneumatic or electric controller which is programmable and preset so that it is operable in response to information received from the analysing means.

6. The system according to claim 1, wherein said control means comprises a pneumatic or electric controller which is programmable and preset so that it is operable in response to information received from the analysing means.

7. The system according to claim 6 wherein said analysing means is arranged to analyse the mixture in the infeed flow line.

8. The system according to claim 6 wherein said analysing means is arranged to analyse the mixture in one of the output flow lines.

9. The system according to claim 1 further including means for removing gas from the mixture prior to entering the mixture separation apparatus.

10. A mutli-phase mixture treatment system for the treatment of the mixture discharged from an oil well, the system including:
    (a) means for minimizing the weight of the system including at least one cyclone separator comprising elements designed, sized and arranged for separating a more dense liquid component from a less dense liquid component thereof, said separator comprising a separating chamber having a feed inlet at one end, an overflow outlet at said one end and an underflow outlet at the other end;
    (b) an infeed flow line for delivering the multi-phase mixture from the oil well to the feed inlet of the cyclone separator;
    (c) at least two output flow lines from which the separated or partially separated phases are discharged from the overflow and underflow outlets of the cyclone separator; and
    (d) means for controlling the separation of the mixture through the cyclone separator, said means including analyzing means for analyzing the mixture discharged from the overflow outlet of the cyclone separator and central means responsive to information received from said analyzing means for controlling the flow rate in one or more of said flow lines.

11. The system according to claim 10 wherein said analysing means comprises one or more capacitance probes.

12. The system according to claim 11 wherein said analysing means further includes one or more flow indicators.

13. The system according to claim 12 wherein said control means comprises a pneumatic or electric controller which is programmable and preset so that it is operable in response to information received from the analysing means.

* * * * *